No. 735,369. PATENTED AUG. 4, 1903.
J. E. HARKINS & J. B. WILLIS.
TOASTER.
APPLICATION FILED OCT. 13, 1902.

NO MODEL. 2 SHEETS—SHEET 1.

WITNESSES: INVENTORS:
William Stacey James E. Harkins
Henry E. Villrot James B. Willis
By Fish & Thomas
Attorneys No. 735,369. PATENTED AUG. 4, 1903.
J. E. HARKINS & J. B. WILLIS.
TOASTER.
APPLICATION FILED OCT. 13, 1902.
NO MODEL. 2 SHEETS—SHEET 2.

No. 735,369. Patented August 4, 1903.

UNITED STATES PATENT OFFICE.

JAMES E. HARKINS AND JAMES B. WILLIS, OF ANN ARBOR, MICHIGAN.

TOASTER.

SPECIFICATION forming part of Letters Patent No. 735,369, dated August 4, 1903.

Application filed October 13, 1902. Serial No. 126,975. (No model.)

*To all whom it may concern:*

Be it known that we, JAMES E. HARKINS and JAMES B. WILLIS, citizens of the United States, residing at Ann Arbor, county of Washtenaw, State of Michigan, have invented a certain new and useful Improvement in Toasters; and we declare the following to be a full, clear, and exact description of the invention, such as will enable others skilled in the art to which it pertains to make and use the same, reference being had to the accompanying drawings, which form a part of this specification.

Our invention relates to improvements in toasters for use on gas and oil stoves and is shown in the accompanying drawings, in which—

Figure 1:
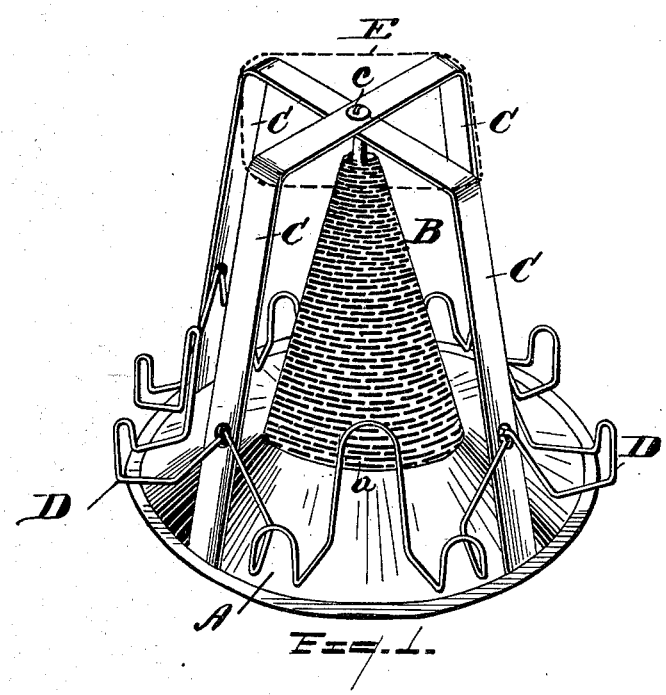
Figure 2:
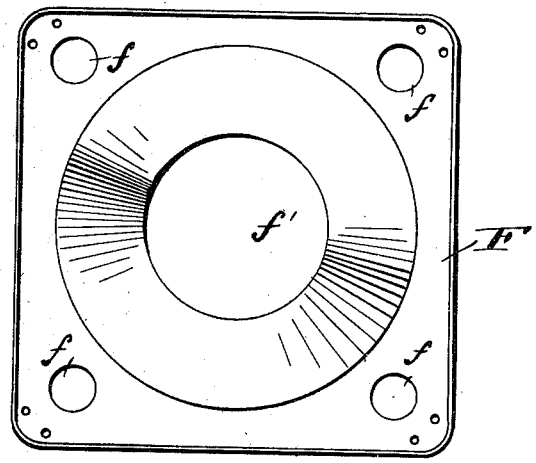
Figure 3:
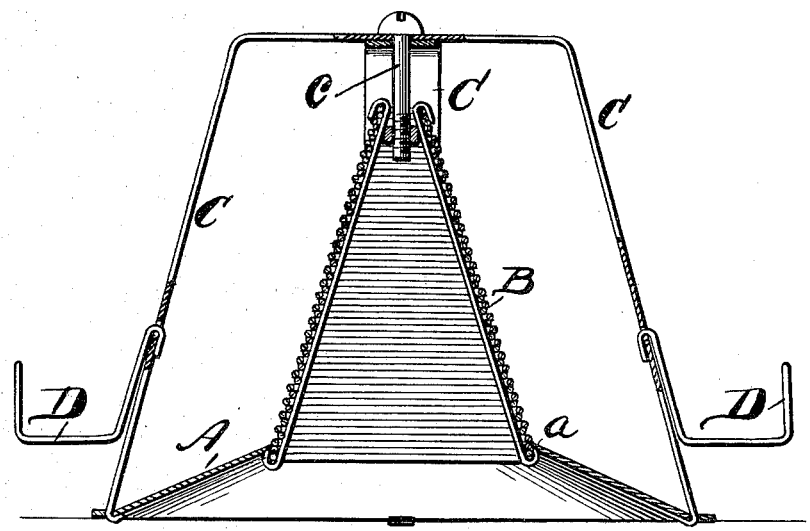
Figure 4:
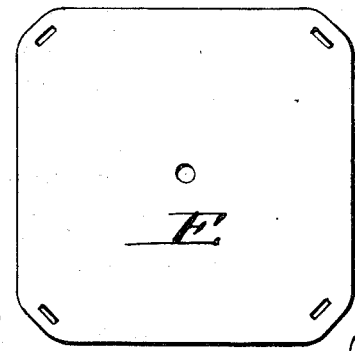

Figure 1 is a perspective view of our improved device, a variation being shown in dotted lines. Fig. 2 is a plan view of a variation in the form of the bottom. Fig. 3 is a vertical sectional view through the toaster. Fig. 4 is a plan view of a variation indicated by the dotted lines in Fig. 1.

In the drawings, A represents the bottom, preferably made circular, as shown in Fig. 1. This bottom is raised from the outer edge toward the center opening $a$, the object being to provide a space underneath the bottom inclined upward to cause the products of combustion and the heated air to move inward toward the center opening in the bottom, thereby concentrating the heat products at the center and delivering them up through the center opening.

B represents a cone-shaped heater, preferably made of interlaced copper wire, the openings between the wire being sufficient to permit the heat products to pass out through the mesh. This cone-shaped wire screen becomes heated, practically, to incandescence.

C C represent supports extending upward from the bottom and in the form shown in Fig. 1 extending over the cone. The pair of supports are connected together at the center directly over the cone by a screw-bolt $c$. The head of this bolt is above the supports C, and a nut inside of the cone, with which the bolt engages, completes the connection between the cone and the supports. The cone at the lower end is made a trifle larger than the opening in the bottom to prevent the cone from being drawn up through the opening, so that the parts are drawn together firmly by the bolts $c$.

D represents a wire extending around the device and is suitably formed to receive and hold slices of bread laid up against each of the four sides of the device. The bread when so placed is in a position to be toasted from the heat radiating from the incandescent cone.

In place of the wire cone a cone of sheet metal suitably perforated may be used.

In Fig. 1 we show in dotted lines a square closed metallic top E. When this top is used, the device differs only in that the supports extending upward from the bottom are connected with the corners of this top instead of passing over and down again to the other side.

In Fig. 2 we show a variation of the form of the bottom. This bottom F is square and provided with a corner-opening $f$ and with a center opening $f'$. Around the center opening the bottom is inclined upward to adapt the device to deflect the heat products into the cone.

While we have shown the cone secured at the top by a bolt, it is apparent that the bolt can be dispensed with by engaging the cone to the base. So, also, the corner-pieces can be dispensed with, if desired.

What we claim is—

1. In a toaster, the combination of a truncated cone-shaped base having a central opening, a cone-shaped heater projecting through the opening in said base, and upright supports secured to the base provided with cross-arms engaged at the center with the cone-shaped heater, substantially as described.

2. In a toaster, the combination of the truncated cone-shaped bottom, upright supports secured to the bottom and provided with cross-arms connected at the center, a cone-shaped heater engaged to the cone-shaped bottom, a screw-bolt projecting down through an opening in the cross-arms, and a nut supported in the upper end of the heater engaging said bolt, substantially as described.

In testimony whereof we sign this specification in the presence of two witnesses.

JAMES E. HARKINS.
J. B. WILLIS.

Witnesses:
EDWD. L. SEYLER,
H. WIRT NEWKIRK.